United States Patent [19]
Freundlieb et al.

[11] Patent Number: 5,418,522
[45] Date of Patent: May 23, 1995

[54] SYSTEM FOR INDICATING AND SIGNALING THE PRESENCE OF SNOW AND ICE

[75] Inventors: Helmut Freundlieb; Hans Latarius, both of Essen, Germany

[73] Assignee: Tekmar Angewandte Elektronik GmbH, Germany

[21] Appl. No.: 775,918

[22] Filed: Oct. 15, 1991

[30] Foreign Application Priority Data

Oct. 15, 1990 [DE] Germany .................. 40 32 734.5

[51] Int. Cl.6 .................. G08B 19/02; H05B 1/02; G01K 7/00
[52] U.S. Cl. .................. 340/581; 219/510; 340/522; 340/602; 364/557; 374/164; 392/338
[58] Field of Search ............ 340/581, 584, 604–605, 340/522, 620, 602; 200/61.04–61.05; 219/509, 201, 209, 510; 392/338; 324/694; 73/335.05; 374/142, 164; 318/483; 364/557; 338/34–35

[56] References Cited

U.S. PATENT DOCUMENTS

| | | | |
|---|---|---|---|
| 3,164,820 | 1/1965 | Hulett | 340/581 |
| 3,891,979 | 6/1975 | Braun et al. | 340/602 X |
| 4,656,333 | 4/1987 | Murphy | 340/602 X |

*Primary Examiner*—John K. Peng
*Assistant Examiner*—Thomas J. Mullen, Jr.
*Attorney, Agent, or Firm*—Blakely, Sokoloff, Taylor & Zaeman

[57] ABSTRACT

A moisture sensor with two heatable concentric moisture electrodes and a temperature sensor detecting the electrode temperature is set into the roadway surface to be monitored. The moisture electrodes are heated by a heating current circuit. The heating current circuit is connected to a computer which has a store for storing device-specific parameters, desired values and a processing program. During each measuring cycle the computer processes the temperatures of the moisture electrodes measured by the temperature sensor and a signal which is representative of the surface moisture. A control signal is produced therefrom which heats the moisture electrodes. An alarm or switching signal is produced when the moisture electrodes have reached a temperature characteristic of the formation of ice and a conductivity indicative of moisture is present between the moisture electrodes.

21 Claims, 3 Drawing Sheets

SYSTEM FOR INDICATING AND SIGNALING THE PRESENCE OF SNOW AND ICE

BACKGROUND OF THE INVENTION

1. Field of the Invention

The invention relates to the field of monitoring free surfaces, such as roadways, paths, crossings, driveways, steps etc. for the formation of snow and ice.

2. Prior Art

German Patent 2 514 489 discloses a system of this type for indicating the presence of snow and ice. Its object is to indicate and register the risk of the formation of snow and ice coatings on roadways, sidewalks, steps, bridges, ramps or roofs and optionally to prevent the formation of snow and ice coatings by switching heating installations on and off. The known device for indicating the presence of snow and ice has a sensor unit containing moisture and temperature sensors disposed in the surface to be monitored, a control device and a connecting line between the sensor unit and control device. A substantial advantage of the known device for indicating the presence of ice and snow is that a separate environmental temperature sensor is dispensed with. The temperature sensor which is in any event necessary to measure the temperature of the moisture electrodes is influenced at least indirectly by the environmental temperature. Disposed within the sensor housing is a thermostat which is controlled by the temperature sensor and which switches the heating current circuit on and off in dependence on the sensor temperature. Also disposed in the sensor housing is a voltage amplifier connected in series with the electrodes. As a result of the thermostatic control of the heating current circuit of the two resistances connected in series, a two point control of the temperatures of the moisture electrodes is produced which is sufficiently reliable and precise for most applications.

U.S. Pat. No. 3,164,820 discloses a snow and ice indicator in which the moisture electrodes are incorporated together with a thermostat and a heating element in a first block and a temperature sensor in a second block in the road surface to be monitored. The combination of the thermostat and heating element results in the moisture sensor always being maintained at a predetermined temperature of about 38° F.

The Invention

It is the object of the invention to produce a reliable indication of the presence of snow and ice, even with small changes in temperature and moisture.

It is a further object so to switch the free surface heaters used for thawing by the system for indicating the presence of snow and ice so that the heaters can be operated with the minimum energy consumption and a high degree of thawing efficiency.

In the invention, a moisture sensor is incorporated in the free surface, e.g. a roadway, to be monitored. The moisture sensor has two moisture electrodes which are exposed to the exterior and which react when they come into contact with melt water on the roadway surface. A temperature sensor monitors the electrode temperature. A computer and a store constitute the nucleus of an evaluation circuit which determines the temperature of the moisture electrodes on the one hand and the conductivity between the moisture electrodes on the other hand and heats the moisture electrodes by way of a heating current circuit in dependence on these measured values. The heating current circuit is activated when the temperature at the temperature sensor falls below a first desired temperature value close to 0° C. that is to say a temperature below freezing prevails above the moisture sensor in the vicinity of the free surface to be monitored. Thereafter the temperature sensor is warmed by the heating current circuit and maintained for a predetermined first time period at the first desired temperature value. Device-specific parameters are input into the associated computer store. The actual value of the environmental temperature is determined from these parameters in conjunction with the actual current in the heating current circuit. The sensor temperature is then controlled in dependence on the environmental temperature in a subsequent second predetermined time period to a temperature range which lies between the first desired temperature value and a second higher desired temperature value. The evaluation circuit produces an alarm and/or switching signal when not only i) a sensor temperature characteristic of the formation of ice is reached; but also ii) a conductivity between the moisture electrodes indicative of the degree of moisture is exceeded. This signal, referred to hereinafter as the indicating signal, can be used to control a surface heater and thawing device which is arranged in the vicinity of the moisture sensor in the free surface (roadway) to be monitored.

The invention enables a very rapid determination of all the conditions which are prerequisite for the formation of ice on a roadway surface. The thawing of the roadway can be effected by the brief switching on of a surface heater and/or thawing device. Minimum heating durations result in high efficiency.

In the preferred embodiment of the invention the setting of the desired temperature values in the first and second time periods is effected by continuous or quasi-continuous control, in particular p-control.

The moisture electrodes are preferably heated with alternating current at mains frequency. The manipulated variable, i.e. the heating current, can be altered by varying the number of current waves or current pulses permitted through the heating current circuit per unit of time. If the time unit is one second, the maximum possible number of current waves is 50 (if the mains frequency is 50 Hz).

Subsequent to the second time period the heating current circuit can be interrupted in a third time period whilst the evaluation of the sensor temperature and the moisture measurement is continued unaltered, i.e. when the two critical values of the sensor temperature and moisture are reached the surface heater is switched on. These two conditions have priority during the entire measuring cycle. When it is determined that these two conditions (temperature + moisture) coincide, the heating current circuit of the moisture electrodes is interrupted and the surface heater switched on for the minimum time period.

In the interest of minimising operational costs, particularly at environmental temperatures near to 0° C., the maximum temperature of the surface heated by the surface heater is limited in a further embodiment of the invention. This can either occur with the aid of an unheated, separate sensor which thermally monitors the surface heated by the surface heater and optionally a power limitation or reduction of the surface heater or by means of the temperature sensor itself which can take on other temperature measuring duties in a manner similar to a separate sensor when the surface heater is activated, i.e. when the heating current circuit of the moisture electrodes is interrupted.

In the preferred exemplary embodiment of the invention, the device-specific parameters are the expected minimum environmental temperature and the maximum heating current which is thus required. These values are generally determined and input by the manufacturer. The exposed surfaces of the two moisture electrodes and optionally of a third moisture electrode are disposed concentrically and spaced from one another in a radial plane. An important aspect of a preferred further embodiment of the invention is that heating resistances are so associated with moisture electrodes in such a position that the heating resistances produce substantially the same electrode temperatures even with differing electrode masses in the two moisture electrodes. The first moisture electrode is preferably of cup-shaped construction and the second moisture electrode of annular construction. The mass of the cup-shaped electrode is greater than the mass of the annular electrode. The heating resistance associated with the first moisture electrode is embedded in a groove in the wall of the cup and the heating resistance associated with the second annular moisture electrode is disposed at a certain spacing from this annular electrode. The temperature sensor is arranged in the cup-shaped moisture electrode in intimate thermal transfer contact. A third annular electrode which may be used is arranged concentrically around and spaced from the annular second electrode.

All the electrodes, heating resistances and temperature sensors are embedded, in a preferred exemplary embodiment of the invention, in a plastic dielectric which substantially completely fills the prefabricated sensor cup comprising metal or plastics material and is disposed at the open side somewhat recessed with respect to the edge of the cup, whereby a flat collecting basin for melt water is formed on the sensor surface.

The method of manufacturing this moisture and temperature sensor is preferably characterised in that the heating resistances, the electrodes and a connecting device are firstly mounted on a support plate and the latter inserted into the sensor cup and that the sensor cup is filled with thermoplastic plastics material, particularly polyurethane, by pouring or injection moulding.

Further advantages and a convenient embodiment of the invention will be apparent from the following description of one exemplary embodiment with reference to the drawing.

Further advantageous features and modifications of the invention are indicated in the dependent claims.

The invention will be described below in more detail by way of an exemplary embodiment which is schematically illustrated in the drawings.

DETAILED DESCRIPTION OF THE INVENTION

Figure 1:
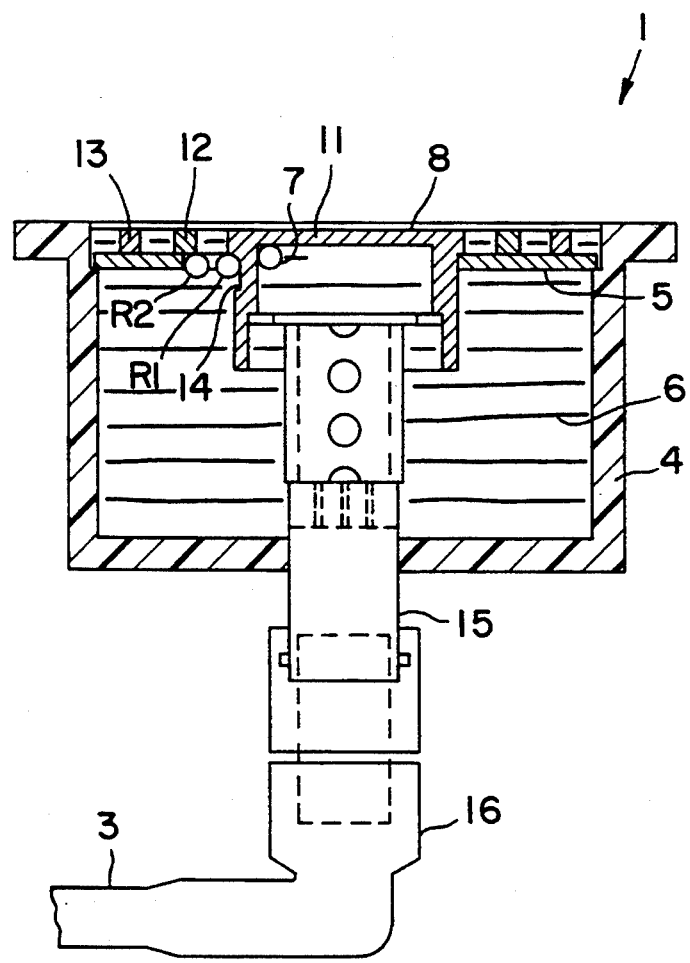
FIG. 1 is a schematic sectional view of a sensor unit which can be used in the device for indicating the presence of ice and snow.

The device in accordance with the invention for indicating the presence of ice and snow has two important components which are generally arranged spatially separated from one another, namely a sensor unit 1 and a control unit 2 which is responsible on the one hand for controlling the temperature and supplying a signal to a surface heater, which is shown in the drawings only as a block 30, and on the other hand for indicating the desired and actual operating states. Sensor unit 1 and control unit 2 are coupled together by means of a multi-conductor electrical connecting line 3.

The sensor unit 1 is shown in schematic sectional elevation in FIG. 1. In practice, it is installed substantially flush in the surface to be monitored, for instance a roadway, a sidewalk, a flight of steps, a bridge surface, a ramp or a roof surface. The sensor unit 1 has a cup-shaped housing 4 of metal or plastics material in which a support plate 5 is installed. The support plate 5 is an annular plate with relatively large holes. It carries, concentrically arranged, a first moisture electrode 7 of cup-shaped construction, a second moisture electrode 12 concentrically surrounding the electrode 11 and spaced from it and—in a special embodiment of the invention—a third electrode 13 which is again concentrically arranged with a spacing. Two heating resistances R1 and R2 are associated with a respective one of the two moisture electrodes 11 and 12. The first heating resistance is so arranged in a groove 14 in the wall surface of the first moisture electrode that it (R1) is intimately thermally coupled to the metallic electrode 11. The heating resistance R2 is mounted in the illustrated example substantially below the dielectric separating the two electrodes 11 and 12 with only a slight overlap with the second moisture electrode 12. The thermal coupling of R2 and the electrode 12 is therefore less intimate. The differing thermal coupling serves to compensate for the differing heat requirement which is necessary to warm up the considerably differing masses of the electrodes 11 and 12. A temperature sensor 8, constructed in the illustrated example as an NTC resistance, is arranged in the cup-shaped moisture electrode 7 in intimate heat-transferring contact so that it can determine the temperature of the moisture electrode 7 with a rapid reaction time. Arranged in or beneath the electrode 11 are a conductive plate, a spacer and a socket arrangement 15. A suitable plug 16 for connecting the connecting line 3 is plugged into the socket arrangement 15. The support plate 5 is enclosed by a plastics mass 6 in the housing cup 4 together with all the components mounted on it including the portion of the socket arrangement 15 situated within the housing cup 4.

When manufacturing the sensor unit 1 the resistances R1, R2 and the moisture electrode 11, which is prefabricated together with the conductive plate, the spacer and socket arrangement 15, are firstly mounted on and connected to the support plate 5 and inserted into the interior of the housing cup 4. The flat surfaces of the electrodes 11, 12 and 13 are somewhat recessed, when installed, with respect to the edge of the housing cup 4 (e.g. 0.5–1.5 mm). A flat liquid reservoir is thus produced, in use, which surrounds the moisture electrodes 11, 12 and 13. In order to fix all the components within the interior of the housing cup 4 and to prevent penetration of liquid, the entire interior of the housing is filled with the plastics mass 6, preferably potted with a polyurethane plastics material. This is effected through holes which are formed in the support plate 5 distributed as uniformly as possible around its periphery. After setting of the plastics mass 6 all the components of the sensor unit 1 are fixed in position and encapsulated in a moisture-tight manner. The exposed electrode surfaces can also be arranged recessed with respect to the surface level of the plastics mass and connected by means of surface passages or slots. In the installed position the latter constitute flow paths between adjacent pairs of electrodes (11 and 12 or 12 and 13). The recessed arrangement of the electrodes 11 to 13 has the advantage in conjunction with the narrow melt water flow paths that conductive solid bodies, e.g. nails, clips etc. cannot readily form short circuit paths between the moisture electrodes and produce erroneous indications.

As may be seen in FIG. 1, the end surfaces of all the electrodes 11, 12 and 13 are exposed to the exterior. Any thin film of liquid which coats the exposed surface 8 of the sensor cup results in a step increase in the conductivity between the first and second moisture electrodes 11 and 12 or 12 and 13. This may be electronically determined with the circuit arrangement illustrated in FIG. 2.

Figure 2:
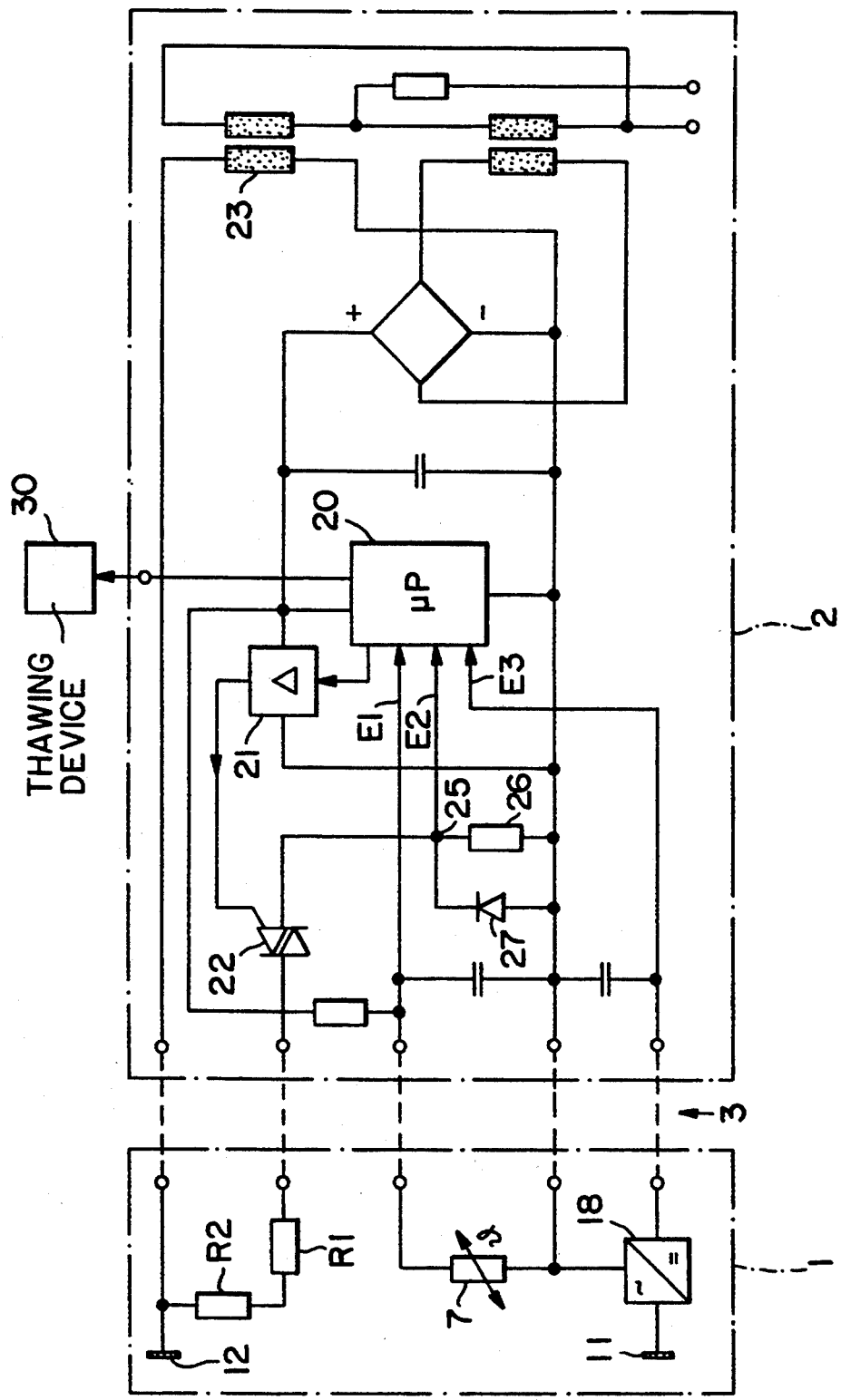
FIG. 2 is a schematic circuit diagram of an exemplary embodiment of the device in accordance with the invention for indicating the presence of ice and snow.

FIG. 2 shows the connection of the electrical components of the sensor unit 1 via the connecting line 3 with the control unit 2. Of the three electrodes in FIG. 1, only the two heatable moisture electrodes 11 and 12, which are necessary for the invention, are shown in FIG. 2. The incorporation of the third moisture electrode 13 does not require further conductors in the connecting line 3; instead a simple connection to the electrode 11 is provided in order to increase the electrode area and thus the sensitivity.

As shown in FIG. 2, the electrical components of the sensor unit include the two moisture electrodes 11 and 12, the temperature sensor 8 which is constructed as an NTC resistance, a series circuit comprising the first and second resistances R1 and R2 and additionally also a rectifier 18 which is connected to the first sensor electrode 11.

The nucleus of the control unit 2 is a microprocessor ($\mu$P) 20, which controls a controllable two-way thyristor (Triac) 22 via an amplifier 21. The Triac 22 controls the alternating current i which flows in the heating current circuit R1 and R2 and is supplied by an alternating current source 23. When suitably controlled the Triac may be so controlled by the microprocessor 20 that at a mains frequency of 50 Hz it lets through $n=0$ to 50 complete waves of the heating current per second. The quasi-continuous control of the current in the two heating resistors R1 and R2 also behaves correspondingly.

The microprocessor 20 has three signal inputs E1, E2 and E3. The first input E1 is connected via the connecting line 3 to the temperature sensor 7. The second input E2 is connected to a junction 25 which constitutes the pick-up point for a voltage divider with a low value resistance 26 (e.g. 1–2 Ohms) in the heating circuit. Parallel to the voltage divider resistance 26 there is a freewheeling diode 27 which shunts off to the negative pole of the supply current circuit a half wave of the full wave signal permitted through via the Triac 22. E3 is coupled—also via the connecting line 3 in the illustrated exemplary embodiment—to the DC output of the rectifier 18. The microprocessor 20 is informed via E3 that a conductivity indicative of moisture prevails between the two moisture electrodes 11 and 12, whereby E3 is raised to a positive potential.

The remaining components of the basic circuit diagram of FIG. 2 are known to the expert as regards their function and mutual connection so that a more detailed explanation can be omitted here.

The mode of operation and procedural sequence for indicating the presence of snow and ice will be described below with reference to FIG. 2 and the graph of FIG. 3:

The risk of the formation of ice on the monitored surface naturally only exists when the temperature approximately reaches or falls below the freezing temperature. Only when the environmental temperature falls below the triggering threshold of about 0° C. is the heating current circuit activated (by the Triac 22). The microprocessor 20 has at least one but generally a plurality of programmable stores. Device-specific parameters are generally input into this store by the manufacturer and are available in each measuring cycle. Two of these parameters are required in a first method step, that is to say the minimum environmental temperature AT (MIN), e.g. $-20°$ C. and the associated heating current i(MAX) at AT(MIN).

1.0 AT determination/calculation in time period I:
Sensor measurement: —Material/Volume/-Weight=constant; the static hourly heat loss is thus also constant:

1.1 $(TF1-AT)*k*F*1.16\ [W] = i^2*R\ [W]$ or:

1.2 $AT = -i^2*(R/(k*F*1.16)) + TF1$ [° C.] or with $TF1=0$:

1.3 $AT = -i^2*(R/(k*F*1.16))$ [° C.];

TF1=Temp. [° C.] of the measuring point (temperature sensor) within the electrode is maintained with AT $<0°$ C. by means of P-control at 0° C.;

P-range (e.g.): TF1=1° C.;

Adjustment range: $n=0\ ...\ 50$ or $i=0\ ....\ u/R(SUM)$ [A];

1.16=Factor [W,h/kcal]

k=Heat transmission coefficient [kcal/(h*° C.*m$^2$)]

F=Surface area [m$^2$]

u=u(rms) [V] of the heating transformer 23 i=i(rms) [A], measured during the P-control of TF1=0° C.

R=Resistance [Ohms] of the heating resistance

R(SUM)=Total resistance [Ohms] of the heating circuit

AT(MIN)=Minimum external temperature [° C.] (e.g. $-20°$ C.)

i(MAX)=i at AT(MIN) [A] (e.g. 0.2 A of a reference sensor)

With i=i(MAX) then:

1.4 $AT = AT(MIN) = -(i(MAX))^2 * (R/(k*F*1.16))$ [° C.] and with the assumption R=R (desired)=-constant:

1.5 $(R/(k*F*1.16)) = -AT(MIN)/(i(MAX))^2$ [° C./A$^2$] = Sensor constants 1.6 $AT = i^2 * AT(MIN)/(i(MAX))^2$ [° C.]

Tolerances in the resistance of the connecting line, in the voltage divider resistance 26 serving as a measuring resistance and in the mains voltage have no effect.

The time period I is conveniently preset so that the temperature of the temperature sensor 7 can be brought with the aid of the heating resistances R1 and R2 to the desired value TF1(desired)=0° C. Practical measurements have shown that a time period of two minutes and less is sufficient for this purpose.

After the determination of the actual value of the environmental temperature AT it is of importance in the subsequent time period II to maintain the moisture electrodes 11 and 12 heated by means of the heating resistances R1 and R2 associated with them to such an extent that a moisture film on the surface 8 (FIG. 1) of the moisture electrodes 11 and 12 remains (just) above the freezing point even at strongly negative environmental temperatures. It is clear that this condition can only be fulfilled when the moisture electrodes 11 and 12 are heated above the temperature value of 0° C. when using the preferred P-control in the range of an available control range between 0° C. and the desired temperature TF1(MAX)=4° C. at the assumed minimum temperature AT(MIN)=−20° C. (The information regarding the device- and environment- specific parameters of TF1(MAX)=4° C. and AT(MIN)=−20° C. relates to settings which are meaningful in Germany and can be altered in accordance with environmental conditions).

Figure 3:
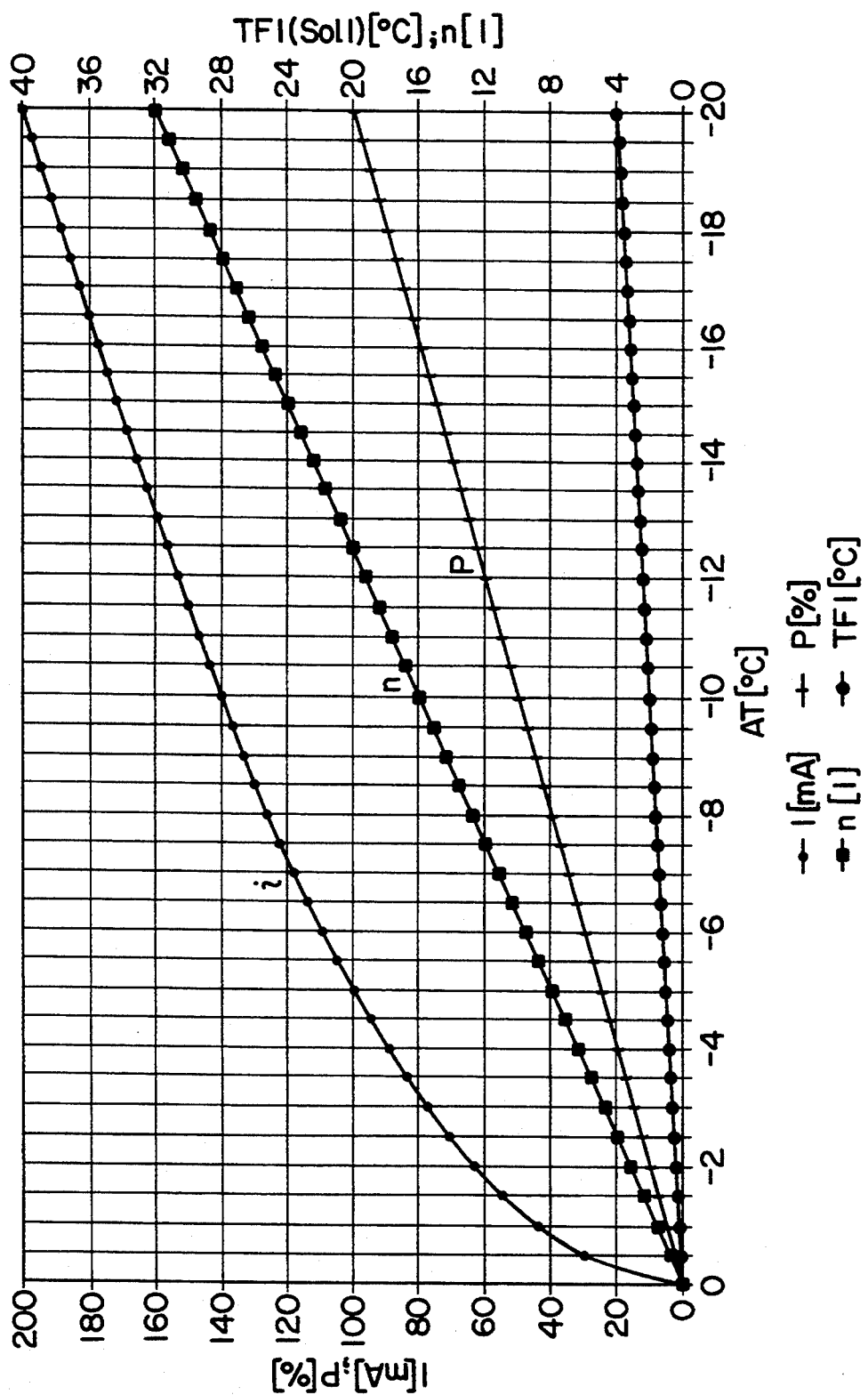
FIG. 3 is a set of curves to explain the control behaviour in one stage of the method in accordance with the invention in which the temperature of the moisture electrodes is controlled between two threshold values.

FIG. 3 shows a diagram of the time period II with the variables, which are important for the invention, for the environmental temperature range of 0 to −20° C. which is assumed in this case. As may be seen, the desired temperature TF1(desired) at the temperature sensor 7 changes in the relevant environmental temperature range for time period II between 0° and −20° C. linearly between 0° and +4° C. The actual temperature at the temperature sensor 7 is the control variable. The manipulated variable in the described system is the number n of the full waves permitted through by the Triac 22. There is a proportional relationship (P-control) between TF1 (control value) and n (manipulated value). The same applies also to the power P which also changes linearly with the environmental temperature. The effective current i goes only indirectly into the control.

For the time period II the following relationship applies $$TF1(desired) = TF1(MAX) * AT/AT(MIN)$$

Associated with the microprocessor 20 are different output and input devices of which only the switching device associated with the thawing device (surface heater) is shown in FIG. 2 as block 30. In the preferred embodiment the new device for indicating the presence of ice and snow also has at least one computer interface, a digital indicator for the desired and actual operational states and light diode indicators which indicate the status of the system, for instance whether the temperature is above or below the thresholds, moisture, alarm, sensor heater, thawing device in operation etc. In the preferred exemplary embodiment there are also suitable adjusters which can alter certain parameters and desired values in the microprocessor 20. The adjustable values are, for instance, the minimum heating period in an adjustment region of 0 to 90 min, the sensitivity of the moisture measurement, the temperature thresholds and the setting of the test cycles. There can also be a selection switch with whose aid the adjusted desired values of minimum time, temperature thresholds and moisture and also the actual values of the temperature sensors can be indicated.

Numerous modifications are possible within the scope of the inventive concept. Thus it is convenient under certain circumstances to arrange the moisture electrodes 11, 12 and/or 13 non-concentrically and even, in sections, non-symmetrically with respect to one another. Instead of the P-control a PID or PI control can be advantageous under certain circumstances. Instead of the alternating current source 23 a direct current source can be provided to power the heating current circuit, whereby the actuating element preferably effects a variation in the direct current pulse lengths in dependence on output signals from the microprocessor 20. Furthermore, a plurality of sensor cups can be associated with a common evaluation arrangement 2.

We claim:

1. System for indicating the presence of snow and ice including:

moisture sensor means having at least two moisture electrodes which are coupled to heating means so as to be heated thereby, said moisture electrodes being exposed to the environment so as to react to the presence of moisture therebetween to provide a conductivity level output signal, and temperature sensor means to sense the temperature of at least one of said moisture electrodes and to output signals indicative thereof, said temperature sensor means being held in heat-transferring contact with said at least one moisture electrode;

means for heating said at least two moisture electrodes, said heating means having at least one heating current circuit and control and actuating means for varying a quantity of heating current used by said at least one heating current circuit;

computer means being coupled with the moisture sensor means and temperature sensor means for receiving said signals from said temperature sensor means and for controlling the heating current in said at least one heating current circuit;

storage means associated with the computer means for storing predetermined parameters and a program which, when run by the computer means, directs the system to perform the following functions:

(i) activating said at least one heating current circuit when the temperature sensed by the temperature sensor means falls below a first desired temperature value, said first desired temperature value lying in a range of temperatures, said temperature range having at least one endpoint close to 0° C., (ii) controlling said at least one heating current circuit so that the temperature sensed by the temperature sensor means is maintained within a second range of temperatures, whose endpoints are respectively slightly above and slightly below the first desired temperature value, for a predetermined first time period, (iii) determining an updated temperature value from the quantity of heating current used by said at least one heating current circuit and from said predetermined parameters, and (iv) in a subsequent predetermined time period, and in response to the updated temperature value, maintaining the temperature sensed by said temperature sensor means within a third range of temperatures between the first desired temperature value and a second desired temperature value, said second desired temperature value being higher than said first desired temperature value; and means for producing an indicator signal, said producing means being coupled with the computer means and being activated when (i) a temperature characteristic of the formation of ice is sensed by the temperature sensor means, and (ii) said conductivity level output signal exceeds a predetermined level.

2. System as claimed in claim 1, wherein the computer means have a first input, a second input and a third input, said first input being coupled with the temperature sensor means for receiving a control signal, said second input being coupled with the heating current circuit for receiving an electrical signal which is characteristic of the heating current, and said third input being coupled to receive an electrical signal which is characteristic of water sensed by said moisture electrodes.

3. System as claimed in claim 2, wherein the heating current circuit is coupled with an alternating voltage source and includes an electrical two-way switch serving as said control and actuating means, whereby the current in the heating current circuit is controlled by variation of the number n of the complete waves (pulses) permitted through the two-way switch per unit time.

4. System as claimed in claim 2, wherein a voltage divider comprising a resistor is incorporated in the heating current circuit and the second computer input is coupled with the voltage divider.

5. System as claimed in claim 4, wherein the voltage divider comprises a circuit having a diode and said resistor coupled in parallel.

6. System as claimed in claim 1, wherein the moisture electrodes have exposed annular surfaces which are arranged concentrically and spaced from one another in a common radial plane.

7. System as claimed in claim 6, wherein equivalent heating resistors are associated with the moisture electrodes in positions such that said equivalent heating resistors produce the same electrode temperatures in both moisture electrodes.

8. System as claimed in claim 6, wherein
the first moisture electrode is of cup-shaped construction and the second moisture electrode is of annular construction, the mass of the first moisture electrode is larger than the mass of the second moisture electrode, a heating resistor associated with the first moisture electrode is embedded in a groove in the cup wall and a second heating resistor associated with the second moisture electrode is arranged at a predetermined distance from the annular electrode.

9. System as claimed in claim 8, wherein the temperature sensor means is integrated into the cup-shaped first moisture electrode in intimate heat-transferring contact.

10. System as claimed in claim 9, wherein a third, unheated annular electrode is arranged concentrically around and spaced from the annular second electrode.

11. System as claimed in claim 9, wherein all the electrodes, heating resistors and temperature sensor means are recessed with respect to the edge of the housing cup and are embedded in a plastics dielectric, said dielectric filling a cup-shaped sensor housing.

12. System as claimed in claim 11, wherein the moisture electrodes are arranged recessed in the plastics dielectric so that surface passages are provided in the dielectric between said moisture electrodes.

13. System as claimed in claim 11, wherein the electrodes, the heating resistances and the temperature sensor means are mounted on a support plate and the support plate is inserted within the sensor housing and affixed thereto.

14. System as claimed in claim 13, wherein said support plate is an annular apertured disc.

15. In a system for indicating the presence of snow and ice, including:

moisture sensor means having at least two moisture electrodes which are exposed to the environment and react to an electrically conductive medium;

temperature sensor means for sensing the electrode temperature at each of said at least two moisture electrodes and to output signals indicative thereof, said temperature sensor means being held in heat-transferring contact with at least one of said at least two moisture electrodes;

means for heating the at least two moisture electrodes, said heating means having at least one heating current circuit; and a computer for receiving said signals from said temperature sensor means and for controlling a heating current in the at least one heating current circuit; a method of indicating the presence of snow and ice, said method including the steps of:

a) storing predetermined parameters and a working program in a storage memory of said computer;

b) activating the at least one heating current circuit when the temperature at the temperature sensor means is less than a first desired temperature, said first desired temperature lying in a range close to 0° C., c) controlling the at least one heating current circuit in such a manner that said first desired temperature is maintained at the temperature sensor means for a predetermined first time period;

d) determining an updated environmental temperature as a function of the heating current and said predetermined parameters;

e) thereafter, in a second predetermined time period, maintaining the temperature at the temperature sensor means in response to the updated environmental temperature within a temperature range between the first desired temperature and a second desired temperature, said second desired temperature being higher than said first desired temperature; and f) producing an indicating signal when
i) a temperature characteristic of the formation of ice is sensed by the temperature sensor means and
ii) a conductivity level indicative of a predetermined moisture level between the at least two moisture electrodes is exceeded.

16. Method as claimed in claim 15, wherein the maintenance of the first and second desired temperatures in the first and second time periods is effected by continuous control.

17. Method as claimed in claim 16, wherein the first and second desired temperatures are P-controlled.

18. Method as claimed in claim 17, wherein alternating current at mains frequency is used for heating the moisture electrodes and wherein said heating is controlled by varying the current waves passed through the at least one heating current circuit per unit time.

19. Method as claimed in claim 16, wherein a limited deviation from the first desired temperature value is permitted in the first time period.

20. Method as claimed in claim 16, wherein the heating current circuit is interrupted in a third time period whilst proceeding with the steps of evaluation of the temperature at the sensor temperature means and measuring the moisture level.

21. Method as claimed in claim 15, wherein an expected minimum environmental temperature and a maximum heating current which are determined and input by a manufacturer, are used as said predetermined parameters.

* * * * *

UNITED STATES PATENT AND TRADEMARK OFFICE
CERTIFICATE OF CORRECTION

PATENT NO. : 5,418,522
DATED : May 23, 1995
INVENTOR(S) : Freundlieb et al.

It is certified that error appears in the above-identified patent and that said Letters Patent is hereby corrected as shown below:

On the title page, in item [56], second column, change "Attorney, Agent, or firm - Blakely, Sokoloff, Taylor & Zaeman" to --Attorney, Agent, or firm - Blakely, Sokoloff, Taylor & Zafman--

In Claim 1 in column 8 at lines 30-32, delete "for receiving said signals from said temperature sensor means"

Signed and Sealed this

Second Day of January, 1996

Attest:

BRUCE LEHMAN

Attesting Officer

Commissioner of Patents and Trademarks